(12) United States Patent
Lemieux et al.

(10) Patent No.: US 7,082,299 B2
(45) Date of Patent: Jul. 25, 2006

(54) TESTING LOOPS FOR CHANNEL CODECS

(75) Inventors: Berthier Lemieux, Tampere (FI); Lene Bache, Turku (FI)

(73) Assignee: Nokia Corporation, Espoo (FI)

( * ) Notice: Subject to any disclaimer, the term of this patent is extended or adjusted under 35 U.S.C. 154(b) by 674 days.

(21) Appl. No.: 10/099,628

(22) Filed: Mar. 15, 2002

(65) Prior Publication Data

US 2003/0040307 A1    Feb. 27, 2003

(30) Foreign Application Priority Data

Mar. 16, 2001    (FI)    .................................. 20010532

(51) Int. Cl.
*H04Q 7/20*    (2006.01)

(52) U.S. Cl. ...................... 455/425; 455/67.14; 455/69; 455/115.2; 370/248; 370/249; 379/22.01; 379/22.02

(58) Field of Classification Search ........ 455/423–425, 455/67.11, 67.13, 67.14, 68, 69, 70, 115.1–115.4, 455/226.1–226.4; 379/22.01, 22.02, 27.02–27.03; 370/247–253
See application file for complete search history.

(56) References Cited

U.S. PATENT DOCUMENTS

| | | | | |
|---|---|---|---|---|
| 4,110,558 A | * | 8/1978 | Kageyama et al. | 375/357 |
| 5,477,531 A | * | 12/1995 | McKee et al. | 370/249 |
| RE36,309 E | * | 9/1999 | Kanai et al. | 370/331 |
| 6,028,845 A | * | 2/2000 | Serikawa et al. | 370/249 |
| 6,614,770 B1 | * | 9/2003 | Kayama et al. | 370/331 |
| 6,931,022 B1 | * | 8/2005 | Sanders et al. | 370/442 |

FOREIGN PATENT DOCUMENTS

| | | |
|---|---|---|
| WO | WO 99/63764 | 12/1999 |
| WO | WO 01/52467 A1 | 7/2001 |
| WO | WO 01/76123 A1 | 10/2001 |

OTHER PUBLICATIONS

ETSI TS 100 939 v7.3.0, "Digital Cellular Telecommunications System (Phase 2+); Mobile Radio Interface Signalling Layer 3; General Aspects (GSM 04.07 version 7.3.0)", 1998, relevant pages.

ETSI TS 101 293 v8.1.0, "Digital Cellular Telecommunications System (Phase 2+); Individual Equipment Type Requirements and Interworking Special Conformance Testing Functions (GSM 04.14 version 8.1.0)", 1999.

3GPP TS 05.05 v8.7.1, "3rd Generation Partnership Project; Technical Specification Group GERAN; Digital Cellular Telecommunications System (Phase 2+); Radio Transmission and Reception,"1999.

* cited by examiner

*Primary Examiner*—Duc Nguyen
(74) *Attorney, Agent, or Firm*—Perman & Green, LLP

(57) ABSTRACT

A method for determining the performance of decoding in a telecommunication system having a decoder and a testing apparatus for supplying test data to the decoder includes generating test data having signalling data in a signalling frame format, mapping the test data into two consecutive frames and transmitting the test data from the testing apparatus to the decoder for decoding. The signalling data is decoded from the received two test data frames and transmitted back to the testing apparatus encoded in one frame. The performance of decoding is determined by comparing the transmitted signalling data and the received signalling data in the test apparatus.

23 Claims, 4 Drawing Sheets

TESTING LOOPS FOR CHANNEL CODECS

The invention relates to a method for measuring the performance of decoding in a telecommunication system.

In wireless digital telecommunication, the analog speech information has to be encoded into digital form and then secured by channel coding before transmission to ensure adequate voice quality, when receiving the signal. For example, in traditional GSM speech coding, speech codecs have had a fixed rate. There has been two full-rate speech codecs and one half-rate speech codec in use in the GSM system. The full-rate speech codecs have the output bit rate of either 13 or 12,2 kbit/s, whereas the half-rate speech codec delivers the output bit rate of 5,6 kbit/s. These output bits representing the encoded speech parameters are fed into the channel coder. The channel coding is the set of functions responsible for adding redundancy to the information sequence. The coding is usually performed on a fixed number of input bits. The output bit rate of the channel coder is adjusted to 22,8 kbit/s in full-rate traffic channel or, respectively, to 11,4 kbit/s in half-rate traffic channel.

Thus, all traditional GSM codecs operate with fixed partitioning between speech and channel coding bit rates, regardless of the quality of the channel. These bit rates never change unless a traffic channel change takes place, which furthermore is a slow process. Consequently, this rather inflexible approach in view of desirable speech quality, on one hand, and system capacity optimisation, on the other hand have led to the development of the AMR codec (Adaptive Multi-Rate).

AMR codec adapts the partitioning between speech and channel coding bit rates according to the quality of the channel, in order to deliver the best possible overall speech quality. The AMR speech coder consists of the multi-rate speech coder, a source controlled rate scheme including a voice activity detector and a comfort noise generation system, and an error concealment mechanism to combat the effects of transmission errors and lost packets. The multi-rate speech coder is a single integrated speech codec with eight source rates from 4.75 kbit/s to 12.2 kbit/s, and a low rate background noise encoding mode.

There are several performance criteria set for the codecs used, for instance, in the GSM system, which performance can be measured by e.g. the frame erasure ratio (FER), bit error ratio (BER) or the residual bit error ratio (RBER) of the received data on any traffic channel TCH. Furthermore, to enable to automate the measurement of the performance, there has been developed a set of testing loops. A set of predefined testing loops are implemented into the mobile station connected to a system simulator. The system simulator activates a specific test loop and starts to supply either random or predefined test data into the codec. The mobile station loops back to the system simulator the data obtained after performing channel decoding. The system simulator is then able to compare the looped back data to the sent data. This way, the performance of the channel decoder part of the codes, for example, can be measured in regard to several criteria.

The problem involved with the arrangement described above is that these testing loops are designed to be particularly suitable for the previous GSM codecs. The AMR codec, however, includes features which are not involved in the previous codecs and, therefore, all the features of the AMR codec cannot be tested by using the known testing loops.

BRIEF DESCRIPTION OF THE INVENTION

The object of the invention is thus to provide an improved method and an apparatus implementing the method to avoid at least some of the above problems. The objects of the invention are achieved by a method and an apparatus, which are characterized in what is said in the independent claims. The preferred embodiments of the invention are disclosed in the dependent claims.

The invention is based on the idea that when the performance of decoding is determined in a telecommunication system, which comprises a decoder and a testing apparatus for supplying test data to the decoder, the measurement is started by generating a test data in the testing apparatus, which test data comprises a signalling data field in a signalling frame format, which is then mapped into two consecutive frames, which are then transmitted to the decoder for decoding. The decoder decodes the signalling data field from the received two test data frames, transmits decoded signalling data field back to the testing apparatus encoded in one frame back to the testing apparatus, whereby no speech parameters or any other data is transmitted. Then the performance of decoding is determined by comparing in the transmitted signalling data field and the received signalling data field in the test apparatus.

Another embodiment of the invention is based on the idea that when the performance of decoding is measured in a telecommunication system, which comprises a decoder and a testing apparatus for supplying test data to the decoder, the measurement is started by generating a test data in the testing apparatus, which test data comprises a signalling data field in a signalling frame format, which is then mapped into two consecutive frames, which are then transmitted to the decoder for decoding. The decoder extracts the received two test data frames separately and transmits each of the two test data frames back to the testing apparatus encoded in one frame format having a length of a speech frame, whereby no speech parameters or any other data is transmitted. Then the performance of decoding is determined by comparing in the transmitted signalling data field and the received signalling data field in the test apparatus.

An advantage of the methods and the apparatus according to the invention is that the performance of the decoder for signalling data having length of two frames can also be measured. Another advantage of the invention is that synchronisation problems relating decoding of signalling data having length of two frames. A further advantage of the invention is that the existing testing apparatus can be utilised with only minor modifications.

BRIEF DESCRIPTION OF THE DRAWINGS

In the following, the invention will be described in greater detail in connection with preferred embodiments and with reference to the attached drawings in which.

DETAILED DESCRIPTION OF THE INVENTION

The invention will be described in the following more in detail, using the GSM system as a preferred platform for the embodiments of the invention. The invention is, however, not limited to the GSM system only, but it can be utilised in any corresponding system where the implementation of test loops counters similar problems. Therefore, the invention can be applied, for example, to the WCDMA (Wideband Code Division Multiple Access) systems, wherein the AMR (Adaptive Multi-rate) codec is also supported.

Figure 1:
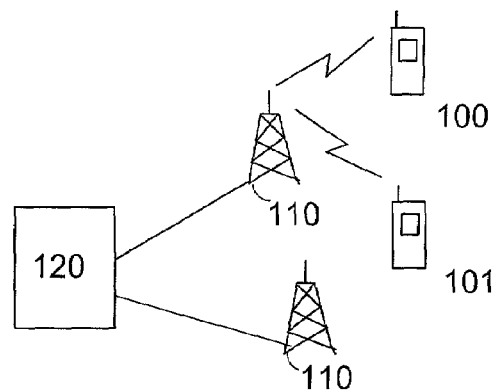
FIG. 1 shows a radio system which uses the method of the invention.

FIG. 1 shows an example of a wireless radio system, some parts of which utilising the method of the invention. The presented cellular radio system comprises a base station controller 120, base transceiver stations 110 and a set of subscriber terminals 100, 101. The base transceiver stations 110 and subscriber terminals act as transceivers in the cellular radio system. The subscriber terminals establish a connection to each other by means of signals propagated through the base transceiver station 110. A subscriber terminal 100 can be a mobile phone, for instance. The radio system presented in FIG. 1 can for instance be a GSM system and the TDMA multiple access method, for instance, can be used in the radio system.

In the GSM system, there are several logical channels, which are transported on the grid of the physical channels. Each logical channel performs a specific task. Logical channels can be divided into 2 categories: the traffic channels (TCHs) and the control channels (CCHs). GSM speech traffic channels are TCH/FS (Full Rate Speech Channel), TCH/HS (Half-Rate Speech Channel), TCH/EFS (EFR Speech Channel), TCH/AFS (AMR Speech on FR Channel) and TCH/AHS (AMR Speech on HR Channel). Furthermore, there are several control channels defined in GSM, most of them being used to set-up a call and for synchronization. However, SACCH (Slow Associated Control Channel), FACCH (Fast Associated Control Channel) and RATSCCH (Robust AMR Traffic Synchronized Control Channel) channels are involved while an AMR call is active. Both SACCH and FACCH are used for transmission of signalling data during a connection, but there is one SACCH time slot allocated in every $26^{th}$ TDMA frame, whereas FACCH channel is used only if necessary. Also RATSCCH, which is used for modifying the AMR configurations on the radio interface during a connection, is used only if necessary. When FACCH or RATSCCH are needed, they are allocated the necessary time slots by "stealing" them from TCH speech frames.

In traditional GSM speech coding, speech codecs have had a fixed rate. There has been three speech codecs in use in the GSM system: the full-rate (FR) speech codec, based on RPE-LTP method (Regular Pulse Excited—Long Term Prediction), the half-rate (HR) speech codec, based on CELP/VCELP method (Codebook Excited Linear Prediction) and the enhanced full-rate (EFR) speech codec, based on ACELP method (Algebraic Codebook Excited Linear Prediction). Speech codecs deliver speech parameters to channel codec every 20 ms. Since the active call logical channel mapping last 120 ms, it contains 6 speech frames. Both in the full-rate traffic channel (TCH/FS) and in the full-rate traffic channel using enhanced coding (TCH/EFS), a new speech frame is sent every $4^{th}$ burst containing TCH information. For every 20 ms speech frame, the full-rate speech codec FR delivers 260 bits and the enhanced full-rate speech codec EFR delivers 244 bits representing encoded speech parameters, resulting in the output bit rate of 13 kbit/s and 12,2 kbit/s, respectively. In the half rate traffic channel (TCH/HS), a new speech frame is sent every $2^{nd}$ burst containing TCH information. For every 20 ms speech frame, the half-rate speech codec HR delivers 112 bits representing encoded speech parameters, resulting in the output bit rate of 5,6 kbit/s.

These output bits representing the encoded speech parameters are fed into the channel coder. The channel coding is the set of functions responsible for adding redundancy to the information sequence. The coding is usually performed on a fixed number of input bits. Higher coding gains are achieved by increasing the complexity of the coding. However transmission delay and limited hardware resources limits the complexity that can be used in real time environment.

Figure 2:
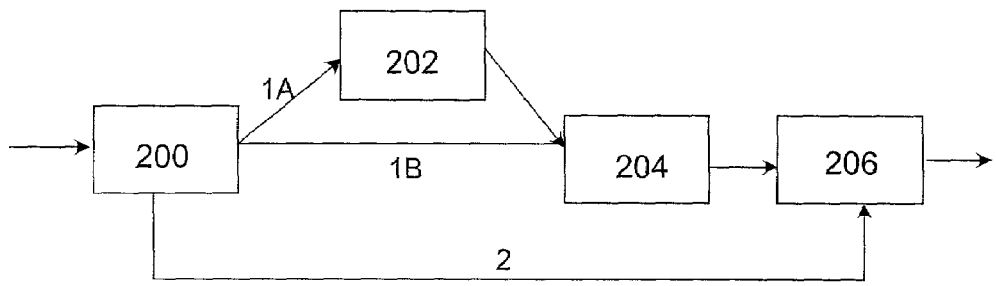
FIG. 2 shows the general structure of the channel encoding chain in the encoder.

In the following, a reference is made to FIG. 2, which illustrates the channel encoding chain in the encoder. The channel encoding of speech parameters consist of several blocks. Bit reordering (200) is performed to the bits of the speech parameters according to subjective importance, dividing the bits into categories 1A, 1B and 2. For the most important bits, i.e. class 1A bits, a CRC (Cyclic Redundancy Check, 202) is computed. The CRC technique transmit few additional bits that can be used by the receiver to detect errors in the transmitted frame. Class 1B bits are not protected by CRC. Both class 1A and 1b bits are protected by convolutional encoding (204), which is a method to add redundancy to the bits transmitted in the channel. The convolutional encoder produce more output bits than input inputs. The way redundancy is added allows the receiver to perform a maximum likelihood algorithm on the convolutionally encoded bits in order to allow the correction of signal errors introduced during transmission. The number of bits that can be sent in the channel is limited. Puncturing (206) is a method to reduce the number of bits sent on the channel by deleting bits from the convolutionally encoded data. The decoder knows which bits are punctured and adds placeholders for those. In FR channel, 456 bits per 20 ms can be sent, resulting in the gross rate of 22,8 kbit/s in full-rate traffic channel. Respectively, in HR channel, 228 bits per 20 ms can be sent, resulting in the gross rate of 11,4 kbit/s, which is exactly half the gross rate of that used in full-rate traffic channel.

As described above, all previous GSM codecs operate with fixed partitioning between speech and channel coding bit rates, regardless of the quality of the channel. These bit rates never change unless a traffic channel change (from FR to HR or vice versa) takes place, which besides is a slow process requiring layer 3 (L3) signalling. This fixed partitioning does not use the fact that the protection provided by channel coding is highly dependant on the channel conditions. When channel conditions are good, a lower channel coding bit rate could be used, allowing an higher bit rate for speech codec. Therefore, allowing a dynamic partitioning between speech and channel coding bit rate would increase the overall speech quality. The development of this idea led to the standardization of the AMR codec.

AMR codec adapts the error protection level to the radio channel and traffic conditions so that it always aims to select the optimum channel and codec mode (speech and channel bit rates) to achieve the best overall speech quality. The AMR codec operates in either the GSM FR or HR channel and it also provides the user with speech quality comparable to wireline for the half-rate channel in good channel conditions.

The AMR speech coder consists of the multi-rate speech coder, a source controlled rate scheme including a voice activity detector and a comfort noise generation system, and an error concealment mechanism to combat the effects of transmission errors and lost packets. The multi-rate speech coder is a single integrated speech codec with eight source rates from 4.75 kbit/s to 12.2 kbit/s, and a low rate background noise encoding mode. The speech coder is capable of switching its bit-rate every 20 ms speech frame upon command.

The AMR codec contains eight speech codecs with bit-rates of 12.2, 10.2, 7.95, 7.4, 6.7, 5.9, 5.15 and 4.75 kbit/s. All the speech codecs are defined for the full-rate channel, while the six lowest ones are defined for the half-rate channel, as shown in the following table.

|         | 12.2 | 10.2 | 7.95 | 7.4 | 6.7 | 5.9 | 5.15 | 4.75 |
|---------|------|------|------|-----|-----|-----|------|------|
| TCH/AFS | X    | X    | X    | X   | X   | X   | X    | X    |
| TCH/AHS |      |      | X    | X   | X   | X   | X    | X    |

A mobile station must implement all the codec modes. However, the network can support any combination of them. For AMR, codec mode selection is done from a set of codec modes (ACS, Active Codec Set), which set may include 1–4 AMR codec modes. This set can be reconfigured at call setup phase, in handover situation or by RATSCCH signalling. Each codes mode provides a different level of error protection through a different distribution between speech and channel coding. All the speech codec modes are allowed to change without the intervention of L3 signalling, enabling fast transition between mode, when channel conditions are varying.

Figure 3:
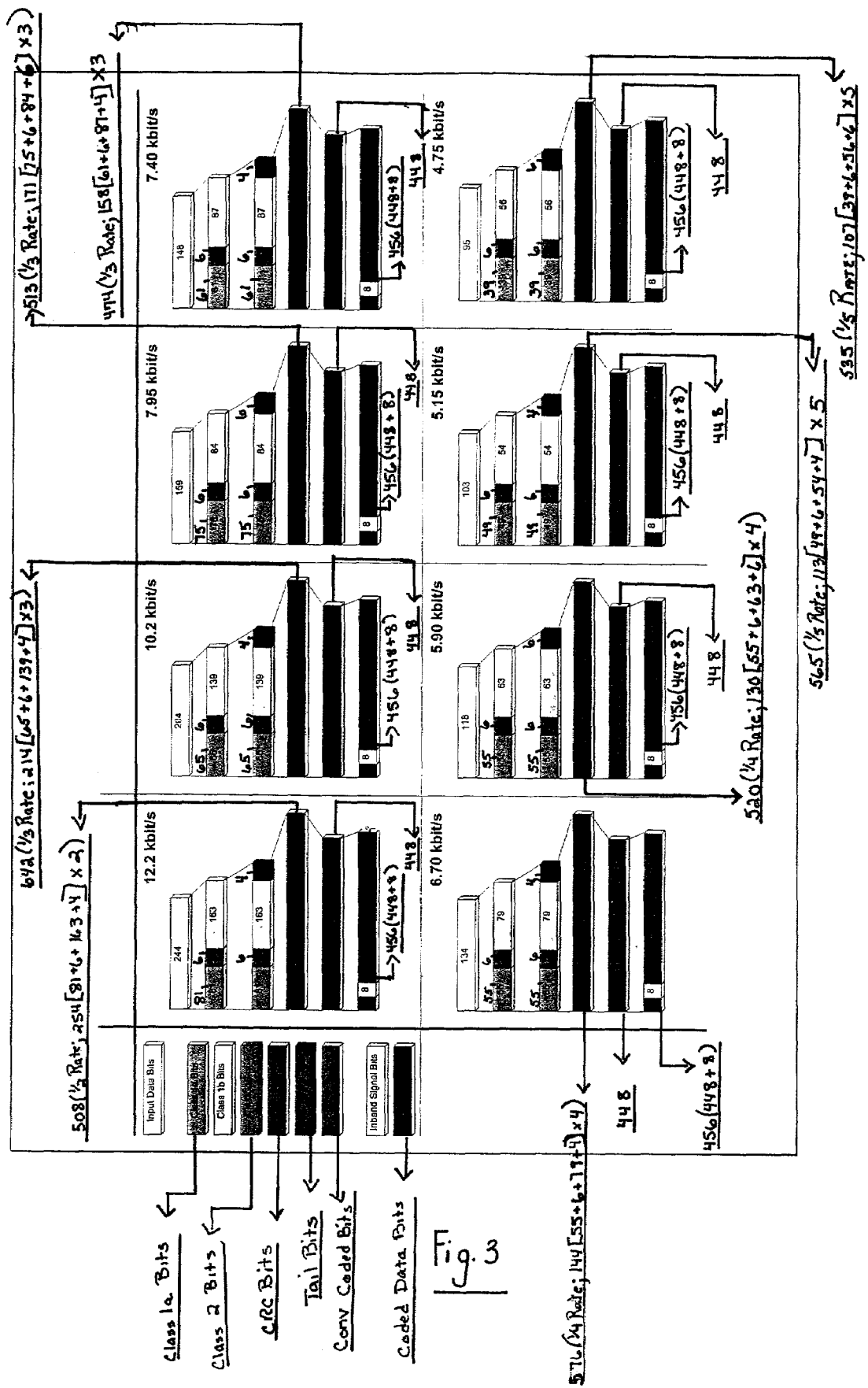
FIG. 3 illustrates the formation of TCH/AFS frames for different codec modes.

FIG. 3 illustrates the formation of TCH/AFS frames for different codec modes. Using for example the 12.2 kbit/s case, the frame is built starting from the 244 bits output by the speech codec. The speech frame bits are reordered and divided into class 1A (81 bits) and 1B (163 bits). For the protection of the 81 class 1A bits a 6 bit CRC is computed. 4 tail bits are added to the block of 250 bits, which tail bits are used for termination of the channel coder. ½ rate convolutional encoding is performed over the block of 254 bits (244+6+4), resulting in a block of 508 bits. The block of 508 bits is then punctured, thus reducing the number of bits to 448 bits. Finally, 8 bits containing inband data are added. The final block of data is 456 bits long.

As shown in FIG. 3, all the TCH/AFS channel encoded frames have the same length (456 bits) even though the number of bits in the input (the speech parameters) differs from mode to mode. The different number of input bits are encoded to exactly 456 output bits by altering the convolutional coding rate and the puncturing rate for each mode. 456 bits sent per every 20 ms, resulting in the gross rate of 22,8 kbit/s, make use of all the bits available from the full-rate traffic channel of the GSM system.

Figure 4:
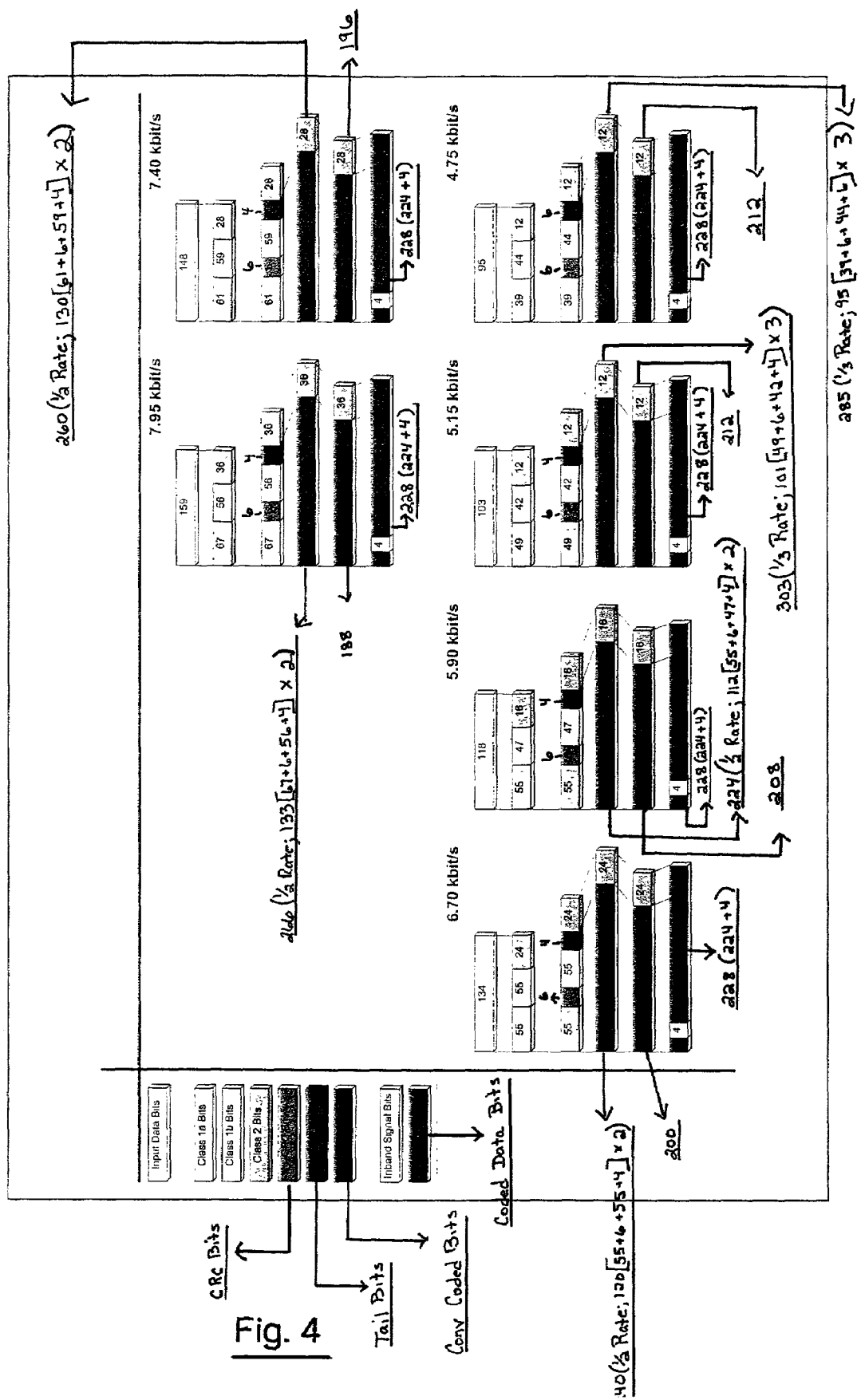
FIG. 4 illustrates the formation of TCH/AHS frames for different codec modes.

Respectively, FIG. 4 demonstrates the formation of TCH/AHS frames for the six different codec modes. The principle of frame building is similar to the case of TCH/AFS frames, with a few exceptions. In bit reordering, the bits are divided into class 1A, 1B and 2 bits, while in TCH/AFS frames only classes 1A and 1B are used. These class 2 bits are not convolutionally encoded. Furthermore, only 4 inband data bits are added to the convolutionally coded frame. In all TCH/AHS codec modes, the channel encoded frames are 228 bits long. 228 bits sent per 20 ms, resulting in the gross rate of 11,4 kbit/s, fulfills the requirements of the GSM system for the half-rate traffic channel.

As described earlier, there is 8 speech codec modes defined for the AMR and the AMR codec can be used on both existing FR and HR channels. Therefore, there are 14 different codec modes defined (8 for TCH/AFS channel, 6 for TCH/AHS channel) for the AMR.

The link adaptation process bears responsibility for measuring the channel quality. Depending on the quality and possible network constraints (e.g., network load), mode adaptation selects the optimal speech and channel codecs. The mobile station (MS) and the base transceiver station (BTS) both perform channel quality estimation for their own receive path. Based on the channel quality measurements, the BTS sends to MS a Codec Mode Command (CMC, the mode to be used by MS in uplink) and the MS sends to BTS a Codec Mode Request (CMR, the mode requested to be used in downlink). This signalling is sent inband, along with the speech data. The codec mode in the uplink may be different from the one used in downlink, but the channel mode (full-rate or half-rate) must be the same. The inband signalling has been designed to allow fast adaptation to rapid channel variations.

The network controls the uplink and downlink codec modes and channel modes. The mobile station must obey the Codec Mode Command from the network, while the network may use any complementing information to determine downlink and uplink codecs mode.

The speech codec is continuously monitoring if the user is speaking or not. Typically, a phone user speaks less than 40% of the time. When the user is not speaking, it is possible, if enabled by the base station, to stop sending bursts to BS. This has the advantage of saving MS battery power and decrease the air interface interference. If a transmission would be suddenly halted for the time the user doesn't speak, the uplink user would be annoyed and would think there is a fault in the transmission. To avoid that annoying effect, so called comfort noise (encoded as silence parameters) have to be transmitted at regular intervals. This type of intermittent transmission is called DTX (Discontinuous TX).

When the speech codec notices that the user is not speaking, it goes into DTX mode, where it encodes silence parameters instead of speech parameters and informs the channel coder that silence parameters were encoded. The channel coder subsystem must then follow a set of rules to determine if a frame has to be transmitted or not, and what should be transmitted. The set of rules used for AMR differs significantly from the DTX of full-rate and half-rate speech traffic channels.

Several types of new frames have been defined for AMR DTX: SID_UPDATE frame, which contains the silence parameters; SID_FIRST frame, which indicates beginning of a DTX period on TCH/AFS; SID_FIRST_P1 and SID_FIRST_P2 frames, which indicate the beginning of a DTX period on TCH/AHS; ONSET frame, which indicates the end of a DTX period; SID_UPDATE_INH frame, which indicates the speech beginning in the middle of a SID_UPDATE frame on TCH/AHS; and SID_FIRST_INH frame, which indicates the speech beginning before SID_FIRST is completed on TCH/AHS.

All these new frame types are identified by a special marker, to allow detection by the receiver. All the frames can be used by the receiver to keep on DTX state machine synchronization and to keep up-to-date inband information. Only the SID_UPDATE frame transmit parameters that can be used by the speech codec, i.e. the noise parameters. SID_UPDATE frames convey 35 bits used to code the silence parameters. All these bits are protected by a 14 bits CRC. 4 tails bits are added to the block of 49 bits. ¼ rate convolutional encoding is performed over the block of 53 bits (35+14+4), resulting in a block of 212 bits. A marker of 212 bits is joined to the 212 bits containing the encoded noise parameters. Finally, two 16 bits long patterns containing inband data pattern are added (one for MI, other one for MR/MC). The final block of data is 456 bits long, even in the case of TCH/AHS.

According to the channel coder DTX state machine definitions, for the first frame identified as silence by the speech codec, a SID_FIRST frame must be encoded. If no speech is detected in the following frames, the MS will not transmit anything for the next two frames, then channel coder will encode a SID_UPDATE frame. After the first SID_UPDATE frame, a SID_UPDATE frame must be transmitted every $8^{th}$ frame. In addition to SID_FIRST and SID_UPDATE frames, the specifications define several other type of DTX frames, used to transmit inband information. These frames fill the space in bursts that would be otherwise left empty by diagonal interleaving. ONSET frame is generated at the end of a DTX period. Mode indication is transmitted by ONSET frame, so that after a DTX period, the receiver is able to know what is the mode used, regardless of the current phase of mode indication/mode request transmitted along the speech frame. In TCH/AHS only, a SID_FIRST_INH frame is generated when a speech frame is detected after the 2 first bursts of SID_FIRST have already been sent. SID_UPDATE_INH frame have the same role for SID_UPDATE frame.

When possible, it is desirable for better speech quality that the transmitted speech is not decoded and then re-encoded several times; for example, in the case of mobile-to-mobile calls (MMC), the transcoding of the call in two transcoder units in the network is undesirable. Consequently, methods for preventing this so-called tandem coding have been developed, for example in the GSM system. Because this is not the default behavior of the network, special handling of the encoded speech frames by the network is required. This special handling is called the Tandem Free Operation (TFO). The RATSCCH (Robust AMR Traffic Synchronized Control Channel) mechanism may be used in case of TFO to modify the AMR configuration on the radio interface without using additional L3 signalling.

Each RATSCCH message consists of its RATSCCH message identifier and potentially message parameters. In total 35 net bits are available for each message. So far, 3 different requests carried over the RATSCCH protocol have been defined. Only one request is transmitted per RATSCCH frame. The first request is to change the phase of the Codec Mode Indication (CMI) in downlink. Because inband bits are time multiplexed, one frame contains CMI and the next one contains Codec Mode Request CMR. This message will change the meaning of the received inband bits. The second request is to change the AMR configuration on the radio interface without interruption of the speech transmission. The request contains several parameters: Active Codec Set, Initial Codec Mode, and some pairs of threshold and hysteresis values. The thresholds and hysteresis values are used to modify the behavior of the link adaptation algorithm. The third request is to change only the threshold and hysteresis values.

In total 35 net bits are available for each RATSCCH message. All these bits are protected by a 14 bits CRC. 4 tails bits are added to the block of 49 bits. ¼ rate convolutional encoding is performed over the block of 53 bits (35+14+4), resulting in a block of 212 bits. A marker of 212 bits is joined to the 212 bits containing the RATSCCH message. Finally, two 16 bits long patterns containing inband data pattern are added (one for MI, other one for MR/MC). The final block of data is 456 bits long. In TCH/AHS RATSCCH is mapped onto two consecutive speech frames, the RATSCCH_MARKER and the RATSCCH_DATA. Both shall be sent always as one pair.

Like FACCH, also RATSCCH is based on frame stealing. On TCH/AFS, one speech frame is stolen for each RATSCCH message, and on TCH/AHS two speech frames are stolen.

In GSM system, for instance, channel coding algorithms are thoroughly specified. Instead of specifying the channel decoder algorithm, performance criteria are defined and have to be met by the MS. There are several performance criteria set for the channel codecs used in the GSM system, which performance can be measured by e.g. the frame erasure ratio (FER), the bit error ratio (BER) or the residual bit error ratio (RBER) of the received data on any traffic channel TCH. For the GSM system, the criteria is defined more precisely, for example, in the document "3GPP TS 05.05 V8.7.1, *Digital cellular telecommunications system (Phase 2+); Radio transmission and reception*". To facilitate the development and implementation of the channel codecs and to measure the performance of the receiver, a specific apparatus called system simulator (SS) has been defined, which can be used, for example, for type approval purposes. There has been developed a set of testing loops for measuring the performance of the channel decoder. A predefined testing loop is activated in a mobile station connected to the system simulator and the performance is measured in regard to several criteria. For the GSM system, these testing loops are defined more precisely in the document "GSM 04.14 ETSI TS 101 293 V8.1.0, *Digital cellular telecommunications system (Phase 2+); Individual equipment type requirements and interworking; Special conformance testing function*".

These testing loops are designed to be particularly suitable for the previous GSM codecs. The AMR codec, however, includes features which are not involved in the previous codecs and, therefore, all the features of the AMR codec cannot be tested by using the known testing loops. The present invention solves at least some of the problems involved in the AMR testing.

Some problems are related to measuring the performance of decoding of DTX frame. Similar problems are also related to measuring the performance of decoding of RATSCCH frame.

In AMR, for every 20 ms frame, the channel decoder is expected to deliver to the speech decoder the decoded speech parameters (or silence parameters in DTX case) and an RX_TYPE identifier. This identifier classifies the type of the received frame. The RX TYPE identifiers are defined in the following table.

| RX_TYPE Legend | Description |
| --- | --- |
| SPEECH_GOOD | Speech frame with CRC OK, Channel Decoder soft values also OK |
| SPEECH_DEGRADED | Speech frame with CRC OK, but 1B bits and class2 bits may be corrupted |
| SPEECH_BAD | (likely) speech frame, bad CRC (or very bad Channel Decoder measures) |
| SID_FIRST | first SID marks the beginning of a comfort noise period |

-continued

| RX_TYPE Legend | Description |
|---|---|
| SID_UPDATE | SID update frame (with correct CRC) |
| SID_BAD | Corrupt SID update frame (bad CRC; applicable only for SID_UPDATE frames) |
| ONSET | ONSET frames precede the first speech frame of a speech burst |
| NO_DATA | Nothing useable (for the speech decoder) was received. This applies for the cases of no received frames (DTX) or received FACCH or RATSCCH or SID_FILLER signalling frames. |

Since channel decoder is called on a 20 ms basis, the channel decoder is invoked twice when a frame mapped into two consecutive speech frames (the TCH/AHS SID_UPDATE and the TCH/AHS RATSCCH frames) is decoded. In the TCH/AHS SID_UPDATE case, the first frame is classified as NO_DATA and the second frame is classified as SID_UPDATE. In the TCH/AHS RATSCCH case, both frames are classified as NO_DATA for the speech decoder. In addition to that classification, one of the two frame will be signalled as RATSCCH for the RATSCCH protocol handling block.

According to the existing loop principle, the type of the frames looped back by the mobile station is based on the type of the used performance loop. If the loop is testing channel decoding performance of speech frames, speech frames are looped back to the SS. If the loop is testing SID_UPDATE decoding performance, SID_UPDATE frames are looped back to SS. As expected, it takes 2 speech frames to loop back frames that are mapped into 2 speech frames.

A problem arises in measuring the performance of decoding of both RATSCCH and SID_UPDATE transmission when using the half-rate channel TCH/AHS. The problem is due to mapping of the actual frame into two consecutive speech frames. Since the former traffic channel frames of the fixed rate channel codecs only include frames with duration of one speech frame, the existing testing methods cannot be used for measuring the performance of decoding of RATSCCH or SID_UPDATE transmission on TCH/AHS. If the decoder performance is tried to be measured with current test loops and testing equipment (system simulator SS), synchronization problems will occur.

If the test loop is closed in the correct phase, the information looped back by the MS will be SID_UPDATE parameters (for SID_UPDATE performance loop) and RATSCCH parameters (for RATSCCH performance loop). In this situation, the SS can measure correctly the performance of RATSCCH and SID_UPDATE channel decoder.

However, if the test loop is closed in wrong phase, the information sent back by the MS will be all zeros. For SID_UPDATE performance loop, the loop will occur at a time where NO_DATA is signalled to the speech codec. For RATSCCH performance loop, the loop occurs at a time where frame is not signalled as RATSCCH. This will result in an error situation in the SS and the performance of RATSCCH and SID_UPDATE transmission decoder cannot be determined by measuring from the received data.

A new internal test loop has been developed to overcome this problem. In the new test loop, when the received RATSCCH or SID_UPDATE frames have been correctly decoded by the decoder, the decoded RATSCCH parameters or silence parameters are taken from the output of the decoder and looped back as an AMR speech frame. The rest of the speech frame bits are encoded as zeros (erased frame). The speech frame is then encoded and transmitted to the SS. Because speech frames last only 20 ms, two frames will be looped back to the SS. One of them contains the decoded parameters (silence parameters or RATSCCH parameters), the other one contains no useful information. Because the parameters are looped back, the performance of the SID_UPDATE or RATSCCH transmission decoder can advantageously be determined.

Figure 5:
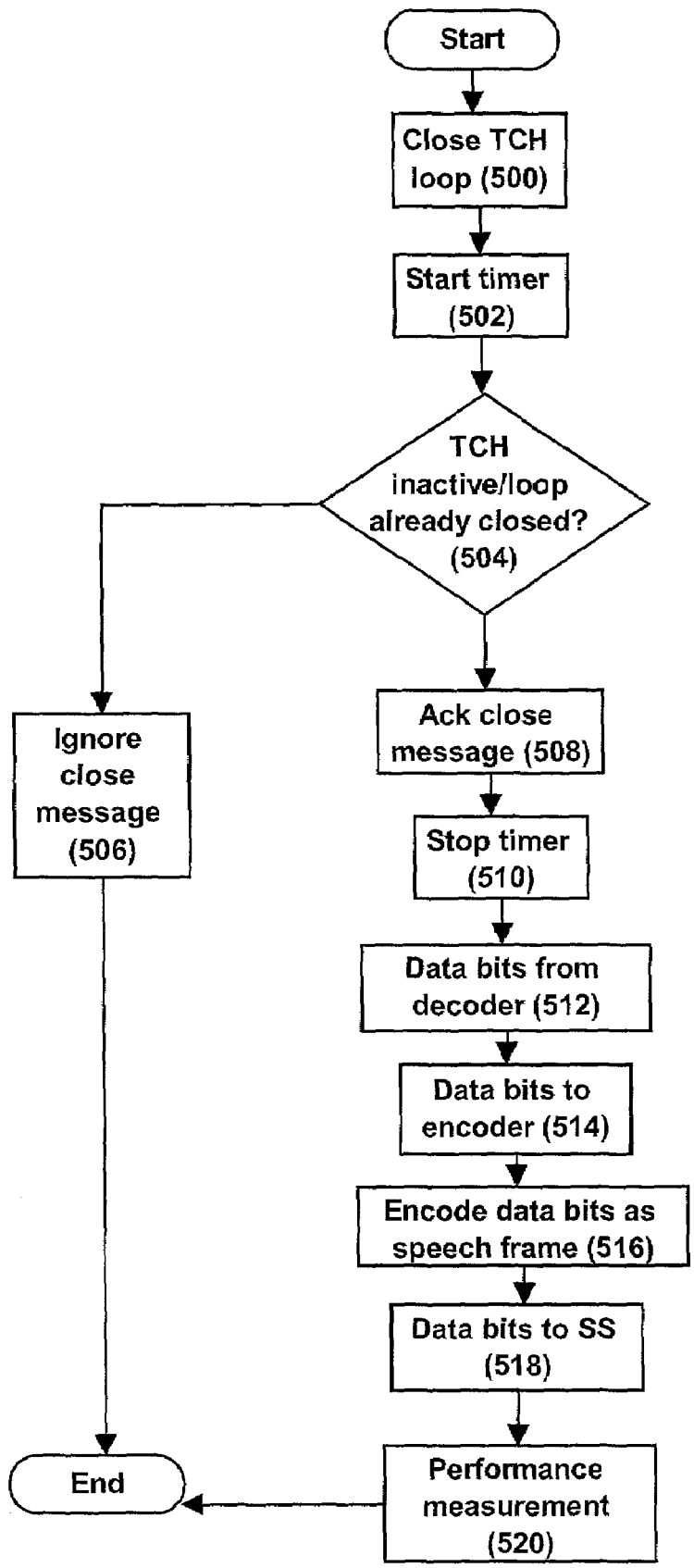
FIG. 5 shows a flow chart illustrating the new testing method according to invention.

The method according to the new testing loop is illustrated with a reference to the flow chart in FIG. 5. To establish a transparent testing loop for TCH frames, a TCH must be active between the SS and the MS. The TCH is preferably half-rate channel specified in the GSM system. The testing loop is activated in an MS by transmitting an appropriate command message to the MS, which command can be, for example, a CLOSE_TCH_LOOP_CMD message according to the GSM system. The SS orders the MS to close its TCH loop by transmitting a CLOSE_TCH_LOOP_CMD message (500), specifying the TCH to be looped and that erased valid SID_UPDATE or RATSCCH frames are to be signalled by the MS. The SS then starts timer TT01 (502), which sets a time limit for the MS to response. If no TCH is active, or any test loop is already closed (504), the MS shall ignore any CLOSE_TCH_LOOP_CMD message (506). If a TCH is active, the MS shall close its TCH loop for the TCH specified and send back to the SS a CLOSE_TCH_LOOP_ACK (508). Upon reception of that message the SS stops timer TT01 (510).

After the MS has closed its TCH loop, decoded parameters for every frame identified as valid SID_UPDATE or RATSCCH frame shall be taken from the output of the channel decoder (512) and input to the channel encoder (514). The data bits of the SID_UPDATE or RATSCCH frames plus a adequate number of fill bits are encoded as an AMR speech frame (516). The speech frame including only the data bits of the SID_UPDATE or RATSCCH frames are transmitted convolutionally encoded on the same TCH/AHS uplink to the SS (518). If a valid SID_UPDATE or RATSCCH frame is not detected by the decoder, this is indicated to the SS by setting the speech frame to be encoded as zeros, and transmitting this convolutionally encoded frame on the same TCH/AHS uplink to the SS. This could happen, for instance, if the received frame pattern is not identified as a SID_UPDATE or RATSCCH frame pattern, or the frame pattern is identified but the CRC bits are corrupted.

The SS determines the performance of the SID_UPDATE or RATSCCH frame decoder from the received erased SID_UPDATE or RATSCCH frames (520), for example, by determining the erased valid SID_UPDATE frame rate (TCH/AHS EVSIDUR) or, respectively, the erased valid RATSCCH frame rate (TCH/AHS EVRFR).

The content of the CLOSE_TCH_LOOP_CMD message is defined more precisely in the above-mentioned document GSM 04.14. This message is only sent in the direction SS to MS. The CLOSE_TCH_LOOP_CMD message comprises four information elements: a protocol discriminator field and a skip indicator field, both having length of four bits and being defined more precisely in the document "GSM 04.07, sect. 11.1.1 and 11.1.2", a message type field having length of eight bits all defined as zeros and a sub-channel field having also length of eight bits. From the sub-channel field bits five bits have a specific meaning in defining the message content and they are called X, Y, Z, A and B bits. Three bits are spare bits set to zero.

The activation of the testing loop according to the invention can be implemented by means of the CLOS- E_TCH_LOOP_CMD message, if one of the spare bits is advantageously also allocated a specific meaning in defining the message content. This new bit can be called, for example, a C bit. Then defining the C bit having value one, a new message content can be defined by a particular bit combination. For example, the following bit combination could be defined: A=0, B=0 and C=1, meaning that if the looped TCH is a TCH/AHS sending SID_UPDATE frames, then valid SID_UPDATE frame erasure is to be signalled. Respectively, another bit combination could be defined: A=0, B=1 and C=1, meaning that if the looped TCH is a TCH/AHS sending RATSCCH frames, then valid RATSCCH frame erasure is to be signalled. For a skilled man, it is obvious that also any other appropriate bit combination can be used. The value of X bit indicates whether there is only one full-rate channel active or which one of the possibly available sub-channels is used. The values of Y and Z bits can be discarded.

According to a second embodiment of the invention, which particularly applicable to RATSCCH transmission, each of the received RATSCCH frames is taken from the output of the decoder separately. The first frame is called RATSCCH_MARKER frame and the second frame is called RATSCCH_DATA frame. Both the RATSCCH_MARKER frame and the RATSCCH_DATA frame are taken from the output of the decoder separately and they are input to encoder as a RECEIVER_MARKER frame and a RECEIVED_DATA frame, respectively. If the RATSCCH-_MARKER frame is not identified or the RATSCCH_DATA frame has a corrupted CRC, a BAD_FRAME frame is input to the encoder. Both the RECEIVER_MARKER frame and the BAD_FRAME frame consist of a predefined pattern, whereas the RECEIVED_DATA frame comprises the data bits transmitted in the RATSCCH_DATA frame. All the looped back frames, i.e. the RECEIVER_MARKER frame, the BAD_FRAME frame and the RECEIVED_DATA frame can be encoded and mapped to a 20 ms frame. This 20 ms frame can be, for example, an AMR speech frame, where the rest of the speech frame bits are encoded as zeros, or a RATSCCH_DATA frame. This 20 ms frame is then transmitted to the SS. This way a successful identification of a RATSCCH_MARKER frame is always reported back to the SS. No synchronisation between the MS and the SS is advantageously needed, because the frames sent back to the SS have the length of only one speech frame.

According to a third embodiment of the invention, the synchronisation of the frame transmission between the MS and the SS (downlink/uplink) can be achieved by setting particular TDMA frame numbers for downlink transmission and uplink transmission, when the test loop is closed. This way the received RATSCCH or SID_UPDATE frame will automatically be transmitted from the MS back to the SS in a predefined frame, and no other mechanism for the synchronisation is needed.

According to a fourth embodiment of the invention, the synchronisation of the frame transmission between the MS and the SS (downlink/uplink), especially when sending RATSCCH frames at half-rate, can be achieved by imposing the MS to cancel the RATSCCH frame currently being sent if a valid RATSCCH frame has just been received. The RATSCCH parameters of the valid RATSCCH frame are then looped back in uplink RATSCCH channel. Also this way the received RATSCCH frame will automatically be transmitted from the MS back to the SS in a manner where the synchronisation is explicitly specified.

Figure 6:
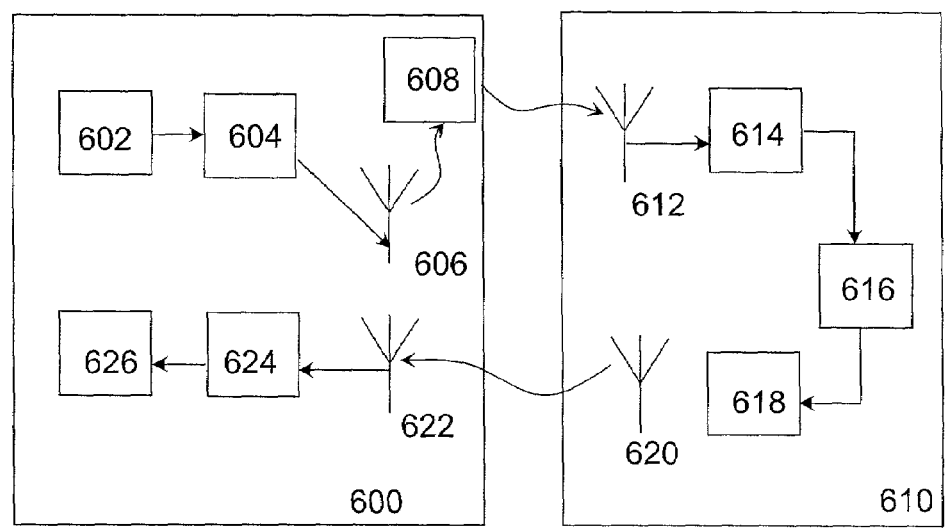
FIG. 6 shows a block chart illustrating the testing apparatus implementing the method according to invention.

The block chart of FIG. 6 illustrates an apparatus which can be applied in testing configuration according to the invention. The system simulator 600 comprises a generator 602 for generating random/constant speech parameter patterns, which are then input to a channel encoder 604 for encoding. The channel encoded speech frames are then supplied to a transmitting means 606 for transmitting further via a channel simulator 608 to the mobile station 610. The mobile station 610 comprises a receiving means 612 for receiving the transmission, from which the channel encoded speech frames are input to the channel decoder 614. The mobile station 610 comprises means 616 for implementing test loops and for executing a specific test loop according to the instructions given by the system simulator 600. The test loop to be used can be defined, for example, by the CLOSE_TCH_LOOP_CMD message, as described above. The output of the test loop is supplied to the channel encoder 618 for encoding. The channel encoded data is then supplied to a transmitting means 620 for transmitting further to the system simulator 600. The system simulator 600 also comprises a receiving means 622 for receiving the transmission, from which the channel encoded data is input to the channel decoder 624. The system simulator 600 comprises comparing means 626 for comparing the received data to the sent pattern and as a result of said comparison, the performance of the decoding can be measured.

For a man skilled in the art it is obvious that in the course of technical progress, the basic idea of the invention can be carried out in numerous ways. Thus, the invention and its embodiments are not limited by the previous examples but they may vary within the scope of the appended claims.

What is claimed is:

1. A method for determining the performance of decoding in a telecommunication system comprising a decoder and a testing apparatus for supplying test data to the decoder, the method comprising steps of
generating test data comprising signalling data in a signalling frame format,
transmitting the test data mapped into two consecutive frames from the testing apparatus to the decoder for decoding,
decoding the signalling data from the received two test data frames,
transmitting said decoded signalling data back to the testing apparatus encoded in one frame, and
determining the performance of decoding by comparing the transmitted signalling data and the received signalling data in the test apparatus.

2. A method according to claim 1, further comprising
activating a traffic channel of the telecommunication system before transmitting the test data, and
transmitting the test data from the testing apparatus to the decoder in the downlink traffic channel and from the decoder to the testing apparatus in the uplink traffic channel.

3. A method according to claim 2, further comprising transmitting the signaling data back to the testing apparatus in the first available uplink traffic channel time frames.

4. A method according to claim 2, further comprising
transmitting, prior to transmitting the test data, a message from the testing apparatus to activate a test loop in the decoder, which test loop is implemented in functional connection with the decoder and
acknowledging said message from the decoder to the testing apparatus, in response to the traffic channel being activated.

5. A method according to claim 4, wherein the message is a bit combination of CLOSE_TCH_LOOP_CMD message according to the GSM system.

6. A method according to claim 1, further comprising determining the performance of channel decoding of RATSCCH frame in AMR half-rate speech channel.

7. A method according to claim 1, further comprising determining the performance of channel decoding of SID_UPDATE frame in AMR half-rate speech channel.

8. A method for determining the performance of decoding in a telecommunication system comprising a decoder and a testing apparatus for supplying test data to the decoder, the method comprising steps of
generating test data comprising signalling data in a signalling frame format,
transmitting the test data mapped exactly into two consecutive frames from the testing apparatus to the decoder for decoding,
receiving the test data one frame at time,
extracting the test data from the received test data frames in the decoder,
transmitting said test data frames back to the testing apparatus encoded in one frame, and
determining the performance of decoding by comparing the transmitted signaling data and the received signaling data in the test apparatus.

9. A method according to claim 8, further comprising transmitting said test data frames back to the testing apparatus encoded in one frame having a length of a speech frame.

10. A method according to claim 8, further comprising activating a traffic channel of the telecommunication system before transmitting the test data, and
transmitting the test data from the testing apparatus to the decoder in the downlink traffic channel and from the decoder to the testing apparatus in the uplink traffic channel.

11. A method according to claim 10, further comprising transmitting the signalling data back to the testing apparatus in the first available uplink traffic channel time frames.

12. A method according to claim 10, further comprising
transmitting, prior to transmitting the test data, a message from the testing apparatus to activate a test loop in the decoder, which test loop is implemented in functional connection with the decoder and
acknowledging said message from the decoder to the testing apparatus, in response to the traffic channel being activated.

13. A method according to claim 12, wherein the message is a bit combination of CLOSE_TCH_LOOP_CMD message according to the GSM system.

14. A method according to claim 8, further comprising determining the performance of channel decoding of RATSCCH frame in AMR half-rate speech channel.

15. A method according to claim 8, further comprising determining the performance of channel decoding of SID_UPDATE frame in AMR half-rate speech channel.

16. A testing apparatus for determining the performance of a decoder, which testing apparatus is arranged to be functionally connected to the decoder, the testing apparatus comprising
a composing means for composing a test data comprising signalling data,
a transmitter for transmitting the test data mapped into two consecutive frames to the decoder for decoding,
a receiver for receiving the test data in one frame from the decoder, said test data comprising the signalling data, and
a comparator determining the performance of decoding by comparing the transmitted signalling data and the received signalling data.

17. A testing apparatus according to claim 16, wherein the testing apparatus is arranged to
activate a traffic channel towards the decoder before transmitting the test data,
transmit the test data to the decoder in the downlink traffic channel, and
receive the test data from the decoder in the uplink traffic channel.

18. A testing apparatus according to claim 17, wherein the testing apparatus is arranged to transmit, prior to transmitting the test data, a message to the decoder to activate a test loop in the decoder, which test loop is implemented in functional connection with the decoder and receive an acknowledgement of said message from the decoder, in response to the traffic channel being activated.

19. A testing apparatus for determining the performance of a decoder, which testing apparatus is arranged to be functionally connected to the decoder, the testing apparatus comprising
a composing means for composing test data comprising signalling data,
a transmitter for transmitting the test data mapped exactly into two consecutive frames to the decoder for decoding,
a receiver for receiving the test data encoded in one frame from the decoder one frame at a time, and
a comparator for determining the performance of decoding by comparing the transmitted signalling data and the received signalling data.

20. A. testing apparatus according to claim 19, wherein the testing apparatus is arranged to
activate a traffic channel towards the decoder before transmitting the test data,
transmit the test data to the decoder in the downlink traffic channel, and
receive the test data from the decoder in the uplink traffic channel.

21. A testing apparatus according to claim 20, wherein the testing apparatus is arranged to
transmit, prior to transmitting the test data, a message to the decoder to activate a test loop in the decoder, which test loop is implemented in functional connection with the decoder and
receive an acknowledgement of said message from the decoder, in response to the traffic channel being activated.

22. A mobile station, comprising
a receiver for receiving test data comprising signalling data mapped into two consecutive frames from a testing apparatus,
a decoder for decoding the test data,
the decoder being arranged to decode the test data from the received two test data frames, and
the mobile station further comprising a transmitter for transmitting said decoded test data back to the testing apparatus encoded in one frame.

23. A mobile station, comprising
a receiver for receiving test data comprising signaling data mapped into two consecutive frames from a testing apparatus,
a decoder for decoding the test data,
the decoder being arranged to receiving the test data one frame at a time, and to extract the test data from the received test data frame in the decoder, and
the mobile station further comprising a transmitter for transmitting said test data back to the testing apparatus encoded in one frame.

* * * * *